United States Patent [19]

Webb et al.

[11] Patent Number: 5,391,300
[45] Date of Patent: Feb. 21, 1995

[54] METHOD FOR THE REMOVAL OF HALOGENATED ORGANIC COMPOUNDS FROM AN ENVIRONMENT

[75] Inventors: Jimmy L. Webb, Ballston Lake; Timothy M. Sivavec, Clifton Park; David G. Gascoyne, Schenectady, all of N.Y.

[73] Assignee: General Electric Company, Schenectady, N.Y.

[21] Appl. No.: 55,599

[22] Filed: May 3, 1993

[51] Int. Cl.⁶ .............................................. B01D 15/00
[52] U.S. Cl. ................... 210/670; 210/692; 210/909
[58] Field of Search ............... 210/670, 673, 674, 692, 210/909; 134/7

[56] References Cited

U.S. PATENT DOCUMENTS

| | | | |
|---|---|---|---|
| 3,429,104 | 2/1969 | Hirshfeld | 210/692 |
| 3,531,463 | 9/1970 | Gustafson | 210/673 |
| 4,234,420 | 11/1980 | Turbeville | 210/695 |
| 4,276,179 | 6/1981 | Soehngen | 210/692 |
| 4,303,531 | 12/1981 | Kawabata et al. | 210/692 |
| 4,726,905 | 2/1988 | Friedman et al. | 210/692 |

OTHER PUBLICATIONS

Article–Environmental Progress (vol. 8, No. 1) Two Strategies for PCB Soil Remediation: Biodegradation and Surfactant Extraction, John B. McDermott, et al. (1989) pp. 46-51.

EPA/600/2-85/125—Treatment of Contaminated Soils with Aqueous Surfactants, W. D. Ellis et al. (Technical Report Data) Nov. 1985 Prepared for Environmental Protection Agency (EPA).

*Primary Examiner*—Ivars Cintins
*Attorney, Agent, or Firm*—James Magee, Jr.

[57] ABSTRACT

Polychlorinated biphenyl compounds are sorbed from aqueous solutions and mixtures by a variety of organic polymeric materials. The contaminant can be desorbed for further processing and destruction.

11 Claims, No Drawings

METHOD FOR THE REMOVAL OF HALOGENATED ORGANIC COMPOUNDS FROM AN ENVIRONMENT

FIELD OF THE INVENTION

This invention relates in general to the removal of various halogenated organic compounds from a medium. More particularly, the invention is directed to remediation of aqueous and solid materials contaminated by HOCs such as polychlorinated biphenyls, dioxins, PAHs, and chlorinated hydrocarbons. The contaminated medium can be described as a substrate since it is the material which carries the contaminant which is acted upon the active elements of the invention.

BACKGROUND OF THE INVENTION

There is currently much interest in and great need for techniques for removing halogenated organic compounds such as polychlorinated biphenyls (PCB's), dioxins, methylene chloride, PAHs, and trichloroethylene from various contaminated environments, particularly soil and water. Flushing and soil washing techniques may be effective in some respects for removing some of these compounds, but the hydrophobic nature of compounds such as the PCB's impedes water-based flushing. Moreover, the volume of contaminated wash liquid presents further handling and clean up problems.

Very significant improvement in the removal of the organic compounds has been realized by the use of aqueous solutions which contain surfactants which increases the water-solubility of the compounds. Surfactant-assisted flushing techniques can result in removal efficiencies of more than about 90%.

However, there are several important considerations associated with the use of surfactant-assisted flushing. For example, the surfactant itself must be environmentally safe, as well as being easily removable from the medium being treated, e.g., contaminated soil. Furthermore, some surfactants may disperse soil or clay particles in such an environment, resulting in the clogging of soil pore spaces. This could lead to diversion of the surfactant from the contaminated area, and a decrease in the efficiency of the entire process.

Moreover, in using aqueous surfactant solutions as a wash liquid, the surfactant and the contaminant (e.g. PCB's) can usually be readily removed from the water, but it is often difficult to selectively remove only the contaminant from the wash liquid thereby leaving a reusable surfactant-containing wash liquid. It has generally not been possible to efficiently recover the surfactant solution for reuse.

One technique for treating aqueous surfactant-contaminant solutions resulting from surfactant flushing involved hydrolysis of the surfactant, as described in *Treatment of Contaminated Soils with Aqueous Surfactants*, W. E. Ellis et al., U.S. EPA Report No. EPA/600/2-85/129, PB 86-122561, 1985. However, such a technique breaks down the surfactant, thereby making recycling impossible.

Another attempt at removing both a PCB contaminant and a surfactant from an aqueous solution involved the use of a PCB-anionic surfactant coprecipitation technique, as described by J. B. McDermott et al. in *Environ. Prog.*, 1989, 8(1), pp 46–51. However, that technique also does not allow the surfactant to be recycled.

Other methods which have also been considered for removing both the organic contaminant and the surfactant from the contaminated medium include leaching accompanied by foam fractionation or adsorption techniques (e.g., the use of clays or activated carbon). However, the relatively high content of surfactants present in the leachate may not make these processes practical.

It is therefore apparent that a need exists for an improved process for removing various hydrophobic organic contaminants from a solid or liquid environment. The process should permit sufficient concentration of contaminants at an efficient absorbing rate. Furthermore, the process should also allow for the recycling of any assisting components, such as aqueous surfactants and should not liberate any constituents which would cause ancillary contamination of the environment being cleaned. The term "sorb" and any derivative thereof as used herein is intended to include adsorption and absorption as the case may be.

SUMMARY OF THE INVENTION

The needs described above are satisfied by an improved method for removing halogenated organic compounds from a medium by absorbing them into a polymeric absorbant which is then separated from the medium. More particularly, the method includes the steps of:

(a) contacting the medium with an aqueous surfactant solution which solubilizes the halogenated organic compounds; followed by (b) contacting the medium with a polymeric material capable of sorbing the organic contaminant absorbing at least 80% by weight of the halogenated organic compounds present in the medium; and then (c) separating the absorber from the medium.

It has been determined that certain polymers are especially effective at sorbing substantially all of the halogenated compounds present in the liquid wash medium, thereby providing an essentially uncontaminated aqueous surfactant solution.

It has also been discovered that some polymers sorb substantially all of the HOCS without simultaneous sorption of surfactant, thereby providing a medium which is free of halogenated contaminants, and has a greatly reduced content of surfactant.

Furthermore, many of the polymeric sorbers of this invention can be separated from the halogenated organic compounds after the process is complete, and regenerated for further use.

In addition to decontamination of aqueous surfactant solutions, the polymeric absorbants disclosed herein can be used to decontaminate soils, sediments, gravel, ground waters and the like by bringing them into contact with the contaminated material for a period of time sufficient to allow transfer of the contaminant to the absorbant which is then separated by conventional means for further processing which may include desorption and destruction of the contaminant.

DETAILED DESCRIPTION OF THE INVENTION

The environment or "medium" which contains the halogenated organic compounds may be in solid form, such as soil; or liquid form, e.g., water, organic solvents, or petroleum-based fluids such as transformer oil. As further described below, either medium is amenable to treatment as long as the polymeric absorber can be put into contact with the organic compounds.

Halogenated organic compounds sometimes referred to hereinafter as contaminant which can be removed by this process include the PCB's mentioned above, dioxins such as tetrachlorodibenzo-p-dioxin (TCDD), methylene chloride, PAHs, and trichloroethylene, as well as many other organic compounds, such as methylene bromide, 1,1,1-trichloroethane, tetrachloroethylene, methylene iodide, methyl iodide, 2-ethylhexyl chloride, and the like.

The process described therein is applicable to treatment of an existing aqueous-based medium, or the initial dispersion of a solid-based medium e.g., contaminated soil in water. Thus, the use of various surfactants which greatly increase the water-solubility or miscibility of chlorinated organic compounds are an important aspect of many embodiments of this invention.

Surfactants suitable for the present invention may be anionic, cationic, or nonionic. Those of ordinary skill in the detergent arts will be readily able to determine an appropriate surfactant, based on factors such as wetting capability and critical micelle concentration, as well as the chemical nature of the particular halogenated compounds contained in the medium. Furthermore, those which are biodegradable may be preferred since their effect on the environment will be minimal.

Examples of suitable anionic surfactants are the various metal complexes and salts of alkyl-, aryl-, or arylalkylsulfates, or the metal complexes of alkyl-, aryl-, or arylalkylsulfonates such as sodium dodecylbenzene sulfonate (SDBS).

Examples of suitable cationic and amphoteric surfactants for this process include fatty quaternary ammonium salts such as distearyldimethylammonium salts, benzylalkyldimethylammonium chloride, amino acids such as N-lauryl-3-amino propionic acid, carboxybetaines such as dodecyldimethyl-ammoniomethane carboxylate, and lecithins such as $\alpha$-phosphatidylcholine.

Illustrative examples of suitable nonionic surfactants for this invention include the family of compounds referred to as alkylphenoxypoly(oxyethylene) alcohols; alkylphenol ethoxylates; and aliphatic ethoxylates. Particularly preferred nonionic surfactants are the various ethoxylated alcohols and ethyoxylated nonylphenols, although it is believed that many of the other common nonionic surfactants will function well in this process.

Nonionic surfactants are preferred for many embodiments of this invention for several reasons. For example, they usually possess lower critical micelle concentration values; and they often have better detergent and solubilization capabilities for mineral and petroleum oils which are commonly used as carriers for PCB's. Mixtures of surfactant classes, in particular nonionic and anionic surfactants are sometimes preferred.

The effectiveness of a polymer to remove contaminants from a particular matrix can be measured in terms of its ability to concentrate HOCs from a contaminated environment. For example, the process of sorbing a contaminant from an aqueous surfactant solution can be best characterized by an equilibrium partition coefficient ($K_p$). The $K_p$, in this case, is simply the ratio of the contaminant concentration in the polymer divided by the contaminant concentration in the surfactant solution, at equilibrium. In this manner, the $K_p$ is descriptive of a polymer's ability to concentrate a particular contaminant from a particular medium. Not all polymeric materials are capable of a concentration of contaminants in this manner. The determination of this ability is a function of the polymer, the contaminant, and the matrix the contaminant is contained in. Furthermore, to be considered "effective", the polymeric sorber must retain its physical properties during exposure to the contaminant and substrate, e.g., it must not become tacky or excessively swell after sorption of the halogenated compounds.

The first class of materials which may be formed into effective absorbers includes natural rubber and polymers formed at least in part from the polymerization of dienes. Natural rubber is of course a well-known material obtained from latex, and is technically referred to as polyisoprene. Although crude natural rubber is thought to be suitable for this invention, cured rubber is preferred. Furthermore, various finished versions of the rubber may be used, e.g., ground rubber obtained from used vehicle tires, as described in the examples.

Synthetic rubbers which are most often formed from the polymerization of dienes are also very suitable polymeric absorbers. Examples of such materials include neoprene, ethylene-propylene-diene (EPDM) rubbers, butadiene-styrene copolymers (SBR), synthetic polyisoprene, butyl rubber, and filled acrylonitrilebutadiene copolymers (nitrile rubber).

Preferred synthetic rubbers include SBR and nitrile rubbers. Nonlimiting examples of SBR materials are elastomeric block copolymers characterized by an A—B, A—B—A', or (A—B)$_m$—X structure, or mixtures of these structures, wherein A and A' are each polymerized vinyl aromatic hydrocarbon blocks, each B is derived from at least one polymerized conjugated diene, X is the radical of a multifunctional coupling agent, and m is an integer of at least 2. These types of materials are well-known in the art, and frequently comprise blocks of polystyrene and polybutadiene. The polybutadiene may be completely-, partially-, or non-hydrogenated. Some examples of suitable block copolymers are provided in U.K. Patent No. 1,264,741, and in U.S. Pat. Nos. 4,935,472, 4,755,566; 4,900,786; and 4,972,021. Commercial examples of styrene/butadiene block copolymers include the various KRATON ® materials available from Shell Chemical Company.

Nitrile rubber, also referred to as acrylonitrile-butadiene rubber or "NBR", is also known in the art, and described, for example, in *The Condensed Chemical Dictionary*, Tenth Edition, Van Nostrand Reinhold Company Inc., 1981, the contents of which are incorporated herein by reference. This material is usually prepared by the random polymerization of acrylonitrile with butadiene by free radical catalysis.

Nitrile rubbers which are effective as absorbers for this invention must contain at least about 5 to 95% by weight of a filler or reinforcing agent, and more preferably, about 20 to 60% by weight of the agent. Exemplary fillers and reinforcing agents are carbon fibers, graphite, glass fibers, mica, talc, and clay. Methods for incorporating these agents into the nitrile rubber are known in the art.

Various other synthetic rubbers may be used as polymeric absorbers, such as polyacrylonitrile, and silicone rubbers. Each of these materials is known to those of ordinary skill in the field of elastomeric polymers.

Another class of materials suitable for polymeric absorbers are polyethylenes and polypropylenes. Polyethylenes are well-known in the art and are described, for example, in the Hawley text mentioned above; and in *Organic Chemistry*, by Morrison and Boyd, 3rd Edition, Allyn and Bacon, Inc., 1973, as well as in U.S. Pat.

No. 4166,055. High density and low density versions are thought to be suitable, as well as the linear low density type. Polypropylene resins which are suitable are described, for example, in the Hawley and Morrison texts mentioned above, as well as in U.S. Pat. Nos. 4,972,021 and 4,764,559. In addition to homopolymers of polypropylene, copolymers which include propylene as a main component; as well as mixtures of propylene polymers with other alpha-olefin polymers, such as ethylene and 1-butene can be used. However, the polypropylene must have an atactic configuration, as described in the Morrison text. Such materials are usually soft and elastic, in contrast to both isotactic and syndiotactic polypropylenes. Polypropylene comonomers which may be present in relatively small proportions include vinyl compounds such as styrene; vinylsilane compounds such as vinyltrimethylmethoxysilane; and unsaturated fatty acids and derivatives thereof, such as acrylic acid, maleic acid, and maleic anhydride. Methods for preparing the various polypropylene resins are well-known in the art.

The next class of materials which are suitable as polymeric absorbers are the elastomeric polyesters. These types of polyesters are generally well known in the art, and are described, for example, in the following U.S. Pat. Nos. 4,732,947; 4,569,973; 4,556,705; 4,556,688; 4,552,950; 4,469,851; and 4,405,749; 4,355,155.

Some of the elastomeric polyesters suitable for this invention contain recurring intralinear long chain ester units of the formula

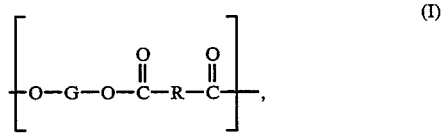

(I)

wherein each G unit represents a divalent organic moiety remaining after removal of terminal hydroxy groups from a poly(alkylene ether) glycol; and R represents a divalent organic moiety remaining after removal of carboxyl groups from a dicarboxylic acid having a molecular weight of less than about 300; interrupted by recurring short chain ester units of the formula

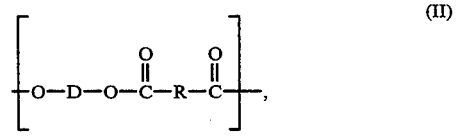

(II)

wherein R is as described above, and D represents a divalent organic moiety remaining after removal of terminal hydroxyl groups from a diol having a molecular weight of less than about 250.

Linear copolyesters having units which correspond to formulae I and II are described in U.S. Pat. Nos. 3,763,109 and 3,784,520. They can be prepared by transesterific ion of the alkyl ester of a dicarboxylic acid having a molecular weight of less than about 300 with a mixture of long chain and short chain diols. Examples of suitable dicarboxylic acids are aliphatic and cycloaliphatic compounds such as sebacic acid; 1,3-cyclohexane dicarboxylic acid, adipic acid, succinic acid, oxalic acid, diethylmalonic acid, and the like, with adipic acid and cyclohexanedicarboxylic acid being preferred for some embodiments.

Aromatic dicarboxylic acids may be used to prepare the copolyesters. Examples are phthalic, terephthalic and isophthalic acid; substituted dicarboxy compounds with contain two benzene nuclei, such as bis(pcarboxyphenyl)methane and p-oxy(pcarboxyphenyl) benzoic acid; and 1,5 naphthalene dicarboxylic acid. Those aromatic acids having 8–16 carbon atoms are preferred; with phthalic, terephthalic, isophthalic acid, and any mixtures of these three acids being most preferred for some embodiments.

In preferred embodiments for these type of copolyesters, at least about 70 mole percent of the dicarboxylic acids incorporated into the polymer will be terephthatic acid, and at least about 30 to 40 mole percent of the low molecular weight diol incorporated into the polymer will be a mixture of 1,4-butanediol with 1,6-hexane diol, optionally with 1,4-butenediol.

Specific examples of some of the preferred copolyesters used to prepare polymeric absorbers for this invention are those prepared from dimethyl terephthatate; 1,4-butanediol; 1,6-hexanediol; and poly(tetramethylene ether)glycol having a molecular weight of at least about 1000–2000, or poly(ethylene oxide) glycol having a molecular weight of at least about 1500–2500. Optionally, up to about 30 mole percent of the dimethyl terephthatate in these polymers can be replaced by dimethyl phthalate or dimethyl isophthalate.

Changing the chemical building blocks results in a variety of other thermoplastic elastomers suitable for this invention. For example, the component corresponding to formula (I) can be replaced with a branched copoly(etherimide) ester component to provide chain units of the formula

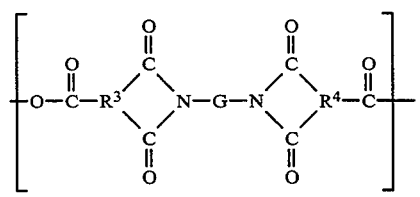

wherein G is as defined above and each $R^3$ and $R^4$ is independently a trivalent organic group, preferably a $C_2$ to $C_{20}$ aliphatic, aromatic or cycloaliphatic triavalent organic group.

Other suitable thermoplastic elastomers include linear copolyesters such as those described in U.S. Pat. No. 4,556,705. Illustrative polymers of this type comprise hard blocks made from the polyesterification of dimethyl terephthalate with butanediol, combined with soft segments of an amine end capped polypropylene glycol which has been-imidized with trimellitic acid. The imide acid soft block can be prepared, for example, by the reaction of a polypropylene ether diamine with trimellitic anhydride.

It is believed that higher "soft block" content in the elastomeric polyesters described above may increase the capacity of the polymer to absorb various chlorinated organic compounds. Thus, in some preferred embodiments, the weight percent of soft block content is at least about 5%, and more preferably, about 40 to 70%.

In the course of experimentation it was discovered that any materials that combined a hard block in combination with a soft block in the polymer backbone were particularly good in applications where the polymer was packed into a column. It was previously mentioned that in this type of situation it is imperative that the material not swell excessively upon sorption of halogenated organic compounds from an aqueous surfactant solution. Soft rubber materials when blended with a hard filler such as carbon showed low swelling in the same application.

Commercial examples of polymers with a hard block soft block polymer backbone for this invention include Lomod resins, available from the General Electric Company, Hytrel resins available from E. I. DuPont Nemours and Company, and PEBAX resins available from Atochem Inc. Rubbers filled with a hard phase that are suitable for this invention include carbon filled EPDM, NBR, SBR and the like. The inventors also found that blends of thermoplastic rubbers with poly(-propylene), such as Vyram, Vistaflex, Trefsin, Santoprene, and Geolast available from Advanced Elastomer Systems (Exxon/Monsanto) showed low swelling in columns.

A particularly effective class of polymers are the polyether block amides PEBAX consisting of rigid polyamide (nylon) blocks and flexible or soft polyether blocks. These resins are available from Atochem Inc. as PEBAX resins.

Another class of materials which are suitable as polymeric absorbers are alkenyl aromatic resins which have a degree of cross-linking of at least 50%. The resins themselves are known in the art and described, for example, in U.S. Pat. Nos. 4,764,559; 4,684,681; 4,383,082; all incorporated herein by reference. Generally, at least about 25% of the units in alkenyl aromatic resins are derived from an alkenyl aromatic monomer of the formula

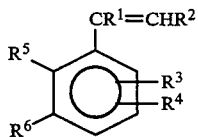

wherein $R^1$ and $R^2$ are selected from the group consisting of hydrogen and lower alkyl or alkenyl groups of form 1 to 6 carbon atoms; $R^3$ and $R^4$ are selected from the group consisting of hydrogen and lower alkyl groups of from 1 to 6 carbon atoms; and $R^5$ and $R^6$ are selected from the group consisting of hydrogen and lower alkyl and alkenyl groups of from 1 to 6 carbon atoms; or $R^5$ and $R^6$ can be concatenated together with hydrocarbyl groups to form a naphthyl group.

Specific examples of alkenyl aromatic monomers include styrene, α-methylstyrene, vinylxylene, divinylbenzene, vinyl naphthalene, and vinyltoluene. Examples of alkenyl aromatic polymers derived from these monomers include homopolystyrene, as well as various copolymers, such as styreneacrylonitrile; styrene acrylonitrile-α-alkyl styrene copolymers; styrene acrylonitrile butadiene copolymers; poly-α-methylstyrene; ethylvinylbenzene copolymers; styrene maleic anhydride copolymers; as well as the various styrene butadiene copolymers described above.

Cross-linking of the various alkenyl aromatic monomers appears to enhance the absorption of the halogenated organic compounds described above. Cross-linking techniques by using various agents such as divinyl benzene (DVB) are well known in the art. In general, the level of cross-linking agent should be at least about 50% by weight of the alkenyl aromatic resin. The most appropriate level of cross-linker can be determined without excessive experimentation by preliminary absorbency tests.

Another class of polymers which are suitable as absorbers for this invention are silicone polyimides, some of which are often referred to as "silicone polyetherimides". These materials are generally well-known in the art and described, for example, in U.S. Pat. Nos. 4,808,686 and 4,690,997. A typical technique for preparing them would involve the reaction of an aromatic bis(ether anhydride) or the corresponding tetracarboxylic acid with amine-terminated polydiorganosiloxanes.

Specific examples of suitable bis(ether anhydrides) are: 2,2'-bis[4(2,3-dicarboxyphenoxy)phenyl]propane dianhydride; 4,4'-bis(2,3 dicarboxyphenoxy)diphenyl ether dianhydride; 1,3-bis(2,3dicarboxyphenoxy)benzene dianhydride; 2,2-bis[4-(3,4dicarboxyphenoxy)phenyl]propane dianhydride ("bisphenol A dianhydride" or "BPADA"); 4,4'-bis(3,4-dicarboxyphenoxy)diphenyl sulfide dianhydride; and 4,4'-bis(3,4dicarboxyphenoxy)diphenylsulfone dianhydride. The amine-terminated polydiorganosiloxanes are also known materials. An example is 3-aminopropyldimethylsiloxy-terminated polydimethylsiloxane, having an average of from about 0 to 100 dimethylsiloxy units. Furthermore, as taught in U.S. Pat. No. 4,690,997, the preparation can also include the use of aryldiamines, such as m-phenylene diamine; p-phenylenediamine; 4,4'diaminodiphenylpropane; 4,4-diaminidiphenylmethane; benzidine; 4,4'diaminodiphenyl sulfide; 4,4'-diaminodiphenyl sulfone; m-xylylenediamine; p-xylylenediamine; 2,4-diaminotoluene; and 2,6-diaminotoluene.

The above-referenced patents describe other particulars regarding silicone polyimides and their preparation, e.g., proportions of starting materials; reaction conditions, and the like. As an illustration, the reaction between the anhydride and the amine-terminated polydiorganosiloxane can be carried out in a dipolar aprotic solvent at a temperature in the range of about 100° C. to about 300° C. A polymerization catalyst such as an alkali metal aryl phosphinate or an alkali metal aryl phosphonate may also be employed. After the polymerization reaction is complete, the product can be isolated and recovered by conventional methods.

Another class of materials which are suitable as polymeric absorbers for the present invention are the polyurethanes. These are well-known polymers, and are described, for example, in Macromolecules 2, H. G. Elias, Plenum Press, 1977, pages 1010–1014, as well as in the Hawley text mentioned above. These materials possess the characteristic chemical grouping (—NH-COO—), and are manufactured commercially by the conversion of various isocyantes with diol compounds.

Various types of polyurethanes may be utilized herein, such as polyurethane foams. These foams can be prepared by the reaction of toluene diisocyanate with polyesters or polyethers having hydroxyl end groups, along with measured amounts of water. Both rigid foams which have a high degree of cross-linking and are manufactured with a large proportion of isocyante and flexible foams which are formed with flexible polymers or polyethers are acceptable.

Various elastomeric polyurethanes may also be used. These materials have a rigid segment of aromatic isocyantes and a flexible segment of flexible macromolecules with hydroxyl end groups. The flexible segments can be aliphatic polyesters, or polyethers such as propylene glycol or polytetrahydrofuran. The rigid segments can be formed from units such as 1,5 naphthylene diisocyanate or p,p'-diisocyanate diphenyl methane.

Yet another class of materials which are suitable as polymeric absorbers for the present invention are those polymers which are derived from alcyl- or aryl-phenols. Examples of the aryl-phenol type are the polymers derived from the oxidative coupling of 2,6-diphenylphenol.

Examples of polymers derived from alkyl-phenols are the polyphenylene ethers (PPE) resins. Suitable types of PPE are well-known in the art, and are described, for example, in U.S. Pat. Nos. 3,306,874; 3,306,875 and 3,432,469; 3,257,357 and 3,257,358; U.S. Pat. Nos. 4,806,602; and 4,806,297. Both homopolymer and copolymer polyphenylene ethers are within the scope of this invention.

The preferred PPE resins are homo- and copolymers which comprise a plurality of structural units of the formula

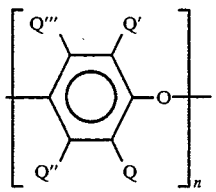

wherein each wherein each Q, Q', Q" and Q''' is independently selected from the group consisting of hydrogen, hydrocarbon groups, halohydrocarbon groups having at least two carbon atoms between the halogen atom and the phenol nucleus; hydrocarbonoxy groups and halohydrocarbonoxy groups having at least two carbon atoms between the halogen atoms and the phenyl nucleus; and Q', Q" and Q''' in addition may be halogen, with the proviso that Q and Q' are preferably free of tertiary carbon atoms.

Examples of suitable primary lower alkyl groups are methyl, ethyl, n-propyl, n-butyl, isobutyl, n-amyl, iso-amyl, 2-methylbutyl, n-hexyl, 2,3-dimethylbutyl, 2-, 3- or 4-methylpentyl, and the corresponding heptyl groups. Examples of secondary lower alkyl groups are isopropyl, sec-butyl and 3-pentyl.

Especially preferred polyphenylene ethers will be comprised of units derived from 2,6-dimethyl phenol. Also preferred in some instances are PPE copolymers comprised of units derived from 2,6-dimethyl phenol and 2,3,6-trimethyl phenol.

The PPE resins of this invention generally have a weight average molecular weight of about 20,000 to 80,000, as determined by gel permeation chromatography. Furthermore, they can be prepared by methods known in the art: for example, oxidative coupling of an appropriate monohydroxyaromatic compound in the presence of a catalyst based on copper, manganese, or cobalt.

The controlling factors in selecting the polymer most appropriate for removing a particular type of HOC include a high $K_p$ for contaminant sorption, a low $K_p$ for surfactant sorption, as well as fast kinetics of PCB uptake. The polymer must also be able to sorb desired contaminants in the presence of other co-contaminants. For example, in the environment PCBs are typically found as a co-contaminant with transformer oil. It is important the polymer retain its ability to sorb PCBs in the presence of this oil. It may even be most desirable if the polymer will sorb both of these contaminants simultaneously.

Other key factors in column applications include the resistance of the polymer to excessive swelling and tack, or to dissolving, upon sorption of the organic compounds, since those characteristics can cause a buildup of pressure in a packed column application. Another factor is the ability of the polymer to efficiently release the organic compound after separation from the substrate being cleaned; and to be reconditioned for further use.

Based on these factors, the most preferred polymers for practicing the present invention are selected from the group consisting of natural rubbers or polymers formed from the polymerization of dienes; elastomeric polyesters; and silicone polyimides.

The polymer sorbers for this invention can be used in the form of powder, pellets, foam or fibers. The size of the powder particles is usually in the range of about 70 nm to 30 mm and more preferably, in the range of about 0.1 to 1 mm. The pellets may range in size from about 1 to 6 mm. Techniques for obtaining the polymers in these forms are not critical to this invention. As an example, extrusion can be used to prepare pellets of specific dimensions, while any suitable methods can be employed to prepare powder. Fibers are typically produced by a melt blown process, and foaming of polymers is a common practice.

It is desirable that the polymer initially be made substantially free of any additives or impurities which could leach into the medium being cleaned. For example, ground automobile tires should be pre-washed prior to use.

The particular technique utilized for contacting the medium being cleaned with the polymeric absorber is not critical to this invention, and depends in part on the nature of the medium. As an example, soil which contains a particular halogenated organic contaminant can initially be mixed with the aqueous surfactant solution. The appropriate weight ratio of soil to surfactant solution is not critical. In general, the minimum amount of aqueous solution which will result in a uniform dispersion of soil particles upon mild agitation or stirring is desirable. Although this process will function even in the absence of a very uniform dispersion, uniformity often results in rapid contact between the contaminant and the polymeric absorber, thereby increasing the sorption efficiency.

An additional factor involved in absorption efficiency is the concentration of the contaminant in the contaminated medium and the desired cleanup level.

Temperature conditions during contact between the polymeric absorber and the halogenated compounds are not especially critical, although the temperature should be maintained below the degradation temperature of the particular polymer serving as an absorber; and preferably, is maintained below that polymer's glass transition temperature ($T_g$). The temperature should also be maintained below the surfactant's cloud point.

The pH of the aqueous surfactant solution used in most embodiments of this invention is not particularly critical, i.e., ambient pH is usually suitable.

A number of samples were taken from a large volume of clay based soil which was previously contaminated with a variety of PCB congeners. The soil samples were pulverized, mixed with water, and wet screened through a 0.6 micron screen. The material was air dried. One kilogram of the dried soil was combined with 2 kilograms of 1 weight percent of an aliphatic ethoxylate surfactant in water. The admixture was stirred for about 30 minutes and allowed to settle for about 2 to 5 hours or filtration was performed without settling. About 50% of the liquid phase was drawn off and replaced with a fresh kilogram of the Renex KB solution. In this manner, washing was repeated as many times as needed to get the PCB concentration in the soil phase down to about 20 ppm or less as measured by gas chromotography. The supernatant wash liquid was combined into single volume of PCB rich surfactant solution which was filtered to remove any solids and then passed through a column packed with 110 grams of Lomod polymer powder having a particle size of about 0.2-0.5 mm at a rate of about 50 cc per minute. The effluent from the column was passed through a UV detector with a detection limit of less than 0.1 ppm.

The PCB-loaded column was backwashed with isopropyl alcohol to regenerate the absorbant polymer. The column was purged with nitrogen to remove as much water and alcohol as possible. The isopropyl alcohol was found to contain from 2000 to 5000 ppm PCB depending on the initial concentration and from about 3 to about 5 volume percent water. This PCB-rich solution is suitable for further treatment to destroy the compounds. In the case of other halogenated contaminants various chemical and bacterialogical methods of dehalogenation and destruction are available to those in the art or under development. FIG. 3 shows the flow diagram for this portion of the process.

It will be apparent that the above described process removes PCBs from contaminated soil by an aqueous surfactant wash and a polymer absorption operation which permits regeration and reuse of the surfactant wash liquid and the polymer absorbant.

In the following examples a variety of surfactants and polymeric materials were tested to demonstrate ability to absorb PCB compounds from a standard soil matrix used by the Environmental Protection Agency as representative of land fill-type soils. The surfactants and polymers are generally commercially available compositions and are more particularly described below.

SURFACTANTS

Renex KB, Renex 30, Renex 36, Renex 31: nonionic surfactants which are polyoxyethylene alkyl ethers commercially available from ICI specialty chemicals.
Igepal®CO630 and CO730: Nonionic surfactants which are alkylphenoxypoly(oxyethylene)ethanols, commercially available from Rhone-Poulane.
Triton®X-100: Nonionic surfactants which is also abased on an alkylphenoxypoly(oxyethylene)ethanol compound, available from Union Carbide.
Sodium dodecylbenzene sulfonate (SDBS): An anionic surfactant available from a variety of sources.

POLYMER MATERIALS

The following polymers were used herein:

Acrylonitrile-Butadiene-Styrene (ABS): Block copolymer.
Neoprene: Polychloprene, synthetic rubber from polymerization of 2-chloro-1,3-butadiene.
HYTREL® Polyetherester copolymers available from E. I. DuPont.
KRATON® D1101, D1107 and G1650 Elastomers: Styrene/butadiene block copolymers available from Shell Chemical Company.
Silicone Polyimide: SILTEM®200 available from GE Silicones.
LOMOD® Resins: Polyether polyetherpolyester block copolymer available from GE Plastics.
ZYTEL® 1016 Resin: An amorphous nylon-6,6 polyamide resin available from E. I. DuPont Company.
Polyethylene
Polypropylene
Polyurethane
Commercial homopolystyrene cross-linked by 1,4 divinyl benzene products such as polysep.
Poly(vinyl chloride):
Polyphenylene ether: Polymer formed from the oxidative polymerization of 2,6-dimethylphenol.
Synthetic Rubber blends: Blends such as polystyrene-polybutadiene containing polybutadiene, petroleum oil and carbon block from pulverized automobile or truck tires.
Poly(2,6-diphenyl-1,4-phenylene oxide ($P_3O$). (Polymer formed from the oxidative polymerization of 2,6-diphenyl phenol, precipitated in a fibrous form.)

EXAMPLE I

Two grams of each of the polymers listed in Table 1 below, in particle form was admixed with a 1% aqueous solution of the surfactants which solution also contained from 100 to 300 ppm of Arochlor 1254. The polymer particles were soaked in the solution for seven days. The amount of Arochlor 1254 remaining in the surfactant solution was determined by ultra violet—HPLC with a C-18 column and a eluent mixture of 85% acetonitrile—15% water by volume. The partition coefficient, $K_p$ was calculated by equilibrium concentration of PCBs in polymer divided by equilibrium concentration of PCBs in solution.

TABLE 1

| | $K_p$ FOR SORPTION OF A-1254 FROM FROM SURFACTANT SOLUTION BY POLYMERS | | | |
|---|---|---|---|---|
| | SURFACTANT TYPE | | | |
| POLYMER TYPE Sorbant Description | Sodium dodecylbenzene sulfonate | Alkylphenol Ethoxylates | Sorbitan Ester Ethoxylates | Ethoxylated Alcohol |
| ABS | 300 | 70 | 515 | 461 |
| Carbonaceous Sorbent | | | | 4269 |
| Dow XUS-40323 | | | | 186 |
| EPDM | | | 1433 | 385 |
| Hytrel | 829 | 370 | 1159 | |
| Lexan | 707 | | | |
| Lomod foam | | | | 287 |
| Lomod Polymer | >1330 | 370 | 1777 | 355 |
| NBR | | | 1408 | 492 |
| Neoprene | 934 | 490 | 1563 | |

TABLE 1-continued $K_p$ FOR SORPTION OF A-1254 FROM FROM SURFACTANT SOLUTION BY POLYMERS

| POLYMER TYPE Sorbant Description | SURFACTANT TYPE | | | |
|---|---|---|---|---|
| | Sodium dodecylbenzene sulfonate | Alkylphenol Ethoxylates | Sorbitan Ester Ethoxylates | Ethoxylated Alcohol |
| Noryl | 723 | | | |
| Nylon | 210 | 70 | 495 | |
| P3O Fibers | 939 | | | 220 |
| Pebax 2533A | | | | 328 |
| Poly(acetal) | 537 | | | |
| Poly(acrylate) | >476 | | | 119 |
| Poly(dimethylsiloxane) | | | 1747 | |
| Poly(ethylene succinate) | 1420 | | | |
| Poly(ethylene terephthalate) | 20 | 0 | 415 | |
| Poly(ethylene) | 759 | 420 | 655 | |
| Poly(phenylene sulfide) | 1378 | | | |
| Poly(propylene) | 635 | 330 | 1657 | |
| Poly(propylene)-EPDM Blend | | | | 193 |
| Poly(propylene)-Natural Rubber Blend | | | | 187 |
| Poly(propylene)-NBR Blend | | | | 180 |
| Poly(styrene) | 730 | | | |
| Poly(styrene)/DVB Copolymer | 385 | 90 | 670 | 315 |
| Poly(sulfone) | 260 | | | |
| Poly(urethane) foam | 934 | 490 | 1722 | |
| Poly(vinyl acetate) | 834 | | | |
| Poly(vinyl chloride) | 295 | 65 | 650 | |
| Polyester Resin | 15 | 0 | 465 | 404 |
| rubber tire retread | >944 | >500 | | |
| SBS | 834 | >500 | 1468 | 706 |
| Siltem 2000 | >944 | >500 | 1812 | |
| Valox PBT, poly(butylene terephthalate) | 351 | | | |
| Ambersorb ® XAD 16 | | | | 464 |

The data in Table 1 demonstrate that the polymeric materials used as part of this invention sorbed a high level of PCB's in a variety of surfactant solutions, in contrast to the poor absorbers which were comparative samples.

Furthermore, [none of the absorbers of this invention swelled excessively or dissolved after being removed form the surfactant solution].

EXAMPLE 2

This example illustrates the decontamination for a PCB-contaminated environmental soil and the sorption and concentration of the PCBs by the treatment of an aqueous surfactant solution contaminant PCB with a polyetherester copolymer in a continuous-flow column sorption process.

Nine hundred eight grams (0.908 kg) of an environmental soil contaminated with PCBs (Aroclor 1242) was combined with 3.50 kilograms of 1 weight percent Renex KB nonionic surfactant in water. The mixture was stirred vigorously at room temperature for 30 min and allowed to settle for an additional 1 hour. Acetic acid (0.26%) was added to aid in the settling of the soil fines. The supernatant wash liquid was filtered through a 0.45 μm PTFE (Teflon) filter to remove any solids to afford approx. 3.5L of a PCB-rich surfactant solution. HPLC and GC-ECD analysis indicated 1005 ppm Aroclor 1242 solubilized in the aqueous surfactant wash solution.

The PCB-contaminated aqueous surfactant solution was passed through a 15.0 cm long stainless steel column (2.54 cm O.D.) packed with 30.0 g Lomod JB610 resin at a rate of 10.0 cc per minute using a positive-displacement pump. Lomod JB610 is a copolymer of polybutylene terephthalate and softblocks composed of poly(tetramethylene glycol) and the condensate of Jeffamine ® D-2000 and trimellitic anhydride. The Lomod resin had a particle size distribution of 0.10-0.50 mm. All connecting tubes, fittings and stopcocks were made of Teflon or stainless steel. A fraction collector was used to collect column effluent samples at 15 minute intervals for PCB analysis by HPLC and GC-ECD.

After 3.5 kilograms of the aqueous surfactant wash had been introduced to the column in a period less than 2 h, no detectable concentration of PCBs was measured in the column effluent samples by direct analysis of the column effluent by HPLC (PCB detection limit 100 ppb). The absence of any detectable PCB concentration in the column output indicates that 3.52 g Aroclor 1242 had been sorbed by the Lomod IB610 resin (3.52 g PCB/30.0 g Lomod JB610 resin) × 100 = 11.7% column loading of PCBs.

The Lomod IB610 resin column was regenerated by passing 0.0 liter 2-propanol (isopropanol, IPA) through the column to completely desorb the PCBs from the Lomod resin. The 2-propanol regenerant solution that exited the column was analyzed by HPLC and GC-ECD. The 2-propanol solution measured 3480 ppm Aroclor 1242 (3.48 g Aroclor 1242 per liter 2-propanol) or 98.9% recovery of the PCBs from the Lomod JB610 column). No attempt was made to minimize the volume of IPA in the regeneration process.

EXAMPLE 3

In another experiment, the sorption capability of a carbon-filled acrylonitrile-butadiene rubber was examined in a continuous-flow column sorption process, using 1 weight percent Renex KB in water as the nonionic surfactant solution which contained carrying amounts of Aroclor 1254, the PCB-containing material and 10C transformer oil, a common co-contaminant of PCBs in the environment. A 15 cm long stainless steel column (7 mm I.D.) was packed with 3.00 g of finely ground carbon-filled acrylonitrile-butadiene rubber (NBR or Buna-N rubber). The ends of the column were capped with 7 mm diameter 5 mm stainless steel frits and were fitted with stainless adapters attached to 1/16 in tubing. A Waters 600 HPLC pump was used to pump the aqueous solution of 1% Renex KB surfactant (also known as Synthrapol KB, ICI Specialty Chemicals) contaminated with 500 ppm PCBs (Aroclor 1254) and 500 ppm 10C transformer oil through the column at a flow rate of 1.00 cc/min. A UV detector (254 nm detection) was connected in series after the column to provide easy detection of column breakthrough of PCBs. The pore volume measured for the carbon-filled NBR column was 2.7–3.0 cc, affording a contact time of approx. 2.7–3.0 min for the PCBs and carbon-filled NBR sorbent. 1.11 Liters of the aqueous surfactant solution containing 500 ppm Aroclor 1254 and 500 ppm 10C transformer oil was introduced to the column at 1.00 cc/min. Aliquats of the column effluent were collected every 30 minutes and were analyzed by HPLC for PCB concentration. No PCBs were detected in the column effluent until 690 mL aqueous surfactant solution had been introduced to the column (i.e., before 0.345g Aroclor 1254 had been removed from the aqueous surfactant by the carbon-filled NBR rubber: 11.5% column loading of PCBs). The results of the column experiment are shown in Table 2, below. The detection limit of the HPLC instrument was determined by be 0.1 ppm Aroclor 1254. In addition, the column effluent collected before column breakthrough of PCBs was extracted with hexane and analyzed on a Hewlett Packard 5890 series II gas chromatograph equipped with a 63Ni electron capture detector (GC-ECD) and a DB-1 (methylsilicone) capillary column (1 mm film thickness, 30 m, 0.32 mm I.D.). PCB concentrations measured less than the instrument detection limit (100 ppb).

TABLE 2

| time, min. | column feed. aq. surfactant soln. cc | concentration of PCBs in column effluent, ppm | weight percent PCBs sorbed by column sorbent |
| --- | --- | --- | --- |
| 0 | 60 | <0.1 | 0% |
| 60 | 60 | <0.1 | 1.0% |
| 120 | 120 | <0.1 | 2.0% |
| 180 | 180 | <0.1 | 3.0% |
| 240 | 240 | <0.1 | 4.0% |
| 300 | 300 | <0.1 | 5.0% |
| 360 | 360 | <0.1 | 6.0% |
| 420 | 420 | <0.1 | 7.0% |
| 480 | 480 | <0.1 | 8.0% |
| 540 | 540 | <0.1 | 9.0% |
| 600 | 600 | <0.1 | 10.0% |
| 720 | 720 | 1.0 | 11.0% |
| 780 | 780 | 4.2 | |
| 910 | 910 | 47.9 | |
| 970 | 970 | 89.4 | |
| 1030 | 1030 | 129.6 | |
| 1090 | 1090 | 186.1 | |

EXAMPLE 4

In this example, the kinetics of sorption of a Lomod JB610 polymer were measured over a 90 minute time frame in a batch experiments. 5.0 grams of Lomod JB610 polymer were added to 200.0 grams of an aqueous 3.0% Renex KB solution that contained 265 Aroclor 1254. The solution was stirred vigorously. 1 ml samples were withdrawn from the solution for HPLC analysis for quantification of Aroclor 1254. The data of PCB sorption is tabulated in Table 3.

TABLE 3

| Time (minutes) | [Aroclor 1254] ppm |
| --- | --- |
| 0.0 | 268 |
| 1 | 185 |
| 1.5 | 157 |
| 2 | 140 |
| 3 | 107 |
| 3.5 | 100 |
| 4 | 93 |
| 4.5 | 84 |
| 5 | 77 |
| 6 | 70 |
| 7 | 62 |
| 8 | 58 |
| 9 | 53 |
| 10 | 51 |
| 15 | 44 |
| 20 | 37 |
| 25 | 41 |
| 30 | 38 |
| 60 | 30 |
| 90 | 33 |

These data demonstrate the rapid and efficient reduction in PCB levels over the course of 90 minutes. The efficiency of sorption was also characterized by a rate constant for the mass transfer of PCBs from solution to polymer. The rate constant for this experiment was measured to be 0.32/minutes. This rate is sufficient to effectively transfer PCBs from solution to polymer in a column application. In a field trial this mass constant was sufficient to effectively transfer PCBs from solution to polymer in a column application. There was no measured loss of the Renex KB surfactant from the solution do to sorption by the polymer. The combination of capacity for PCBs and oil in a mixed system and no measured sorption of surfactant give Lomod JB610 characteristics desired for a column application.

EXAMPLE 5

In this example, the kinetics of sorption of HRG 370 polymer were measured over a 90 minute period in a batch experiment. Here a comparison is made between the sorption kinetics of HRG 370 with and without transformer oil present. In each experiment, 5.0 grams of Lomod HRG 370 polymer were added to 200.0 grams of an aqueous 3.0% Renex KB solution that contained 278 ppm Aroclor 1254. In one case, the solution also contained 2962 ppm transformer oil. The combined mixture of PCBs with transformer oil would be typical of an environmental matrix. The solutions were stirred vigorously. Samples were withdrawn from the solutions for HPLC analysis for the quantitation of Aroclor 1254. The comparative data of PCB sorption with and without oil present is tabulated in Table 4.

TABLE 4

| Time (minutes) | [Aroclor 1254] (ppm) No Oil Present | [Aroclor 1254] (ppm) 2962 ppm Transformer Oil |
| --- | --- | --- |
| 0 | 278 | 278 |
| 0.5 | 172 | 177 |
| 1 | 129 | |
| 1.5 | 114 | 133 |
| 2 | 107 | 118 |
| 2.5 | 101 | 110 |
| 3 | | 106 |
| 3.5 | 99 | 103 |
| 4 | | 100 |
| 4.5 | | 98 |
| 5 | 92 | 94 |

TABLE 4-continued

| Time (minutes) | [Aroclor 1254] (ppm) No Oil Present | [Aroclor 1254] (ppm) 2962 ppm Transformer Oil |
|---|---|---|
| 6 | 82 | 95 |
| 7 | 85 | 91 |
| 8 |  | 90 |
| 9 | 83 | 88 |
| 10 | 68 | 86 |
| 15 | 79 | 83 |
| 25 | 77 | 77 |
| 30 | 70 | 75 |
| 60 | 68 | 69 |
| 90 | 64 | 67 |

These data demonstrate the rapid and efficient reduction in PCB levels over the course of one hour. The efficiency of sorption was also characterized by a rate constant for the mass transfer of PCBs from solution to polymer. The rate constant fro the transfer of PCBs to polymer without oil present was 1.95/minute. When oil was present in the surfactant solution the mass transfer coefficient has measured to be 2.24/minute. A higher mass transfer coefficient indicates faster transfer of PCBs to polymer. These rates are sufficient to accommodate the use of HRG 370 in a column application. It is especially important to note that the rate of PCBs transfer to polymer was not hindered by the presence of transformer oil. Rather the rate of PCB transfer was slightly improved when oil was present.

Other modifications and variations of this invention are possible in view of the description thus provided. It should be understood, therefore, that changes may be made in the particular embodiments shown which are within the scope of the invention defined in the appended claims.

EXAMPLE 6

One or two grams of polymer materials listed in Table 5 below, in particle form was admixed with 10 mL 1 or 3% aqueous solution of the surfactants listed below which solution contained 200–500 ppm Aroclor 1254. The polymer particles were soaked in the solution for 24 h (1% Triton X-100 and Triton X-165) or 7 days (3% Renex KB). The amount of nonionic surfactant remaining in the aqueous solution was determined for the Triton surfactants (polyethoxylated nonylphenol) by HPLC analysis employing a UV detector set at 280 nm and a Waters ® Micropak NH2-10 analytical column (4.0mm×30 cm) eluting with a binary solvent gradient: 90% of a 1:1 THF-hexane/10% of a 1:9 water-2-propanol for 10 min, then 50% of the 1:1 THF-hexane/50% of the 1:9 water-2-propanol for an additional 15 min, then 90% of the 1:1 THF-hexane/10% of a 1:9 water-2-propanol for the final 5 min (total elution time: 30 min). The solvent program used was selected to optimize clean separation of the individual surfactant oligomers. Concentrations of Triton X-100 and X-165 was determined by comparison of total peak areas with those measured for standard solutions. Liquid chromatography-mass spectrometry was employed to identify specific nonionic surfactant oligomers: the $n=1$ to $n=9$ ethylene oxide adducts of nonylphenol (Triton X) were cleanly separated and identified using a chemical ionization method Quantification of Renex KB (polyethoxylated decyl alcohol) was made by HPLC analysis using an evaporative light scattering detector. A MacMod Analytical Inc. Zorbax ODS (4.0 mm×25 cm) column was utilized with an isocratic solvent that consisted on 95% acetontrile and 5% water, at a flow rate of 1.0 ml/minute.

The percentage of nonionic surfactant removed by adsorption to the polymer was calculated by subtracting the final concentration in solution from the initial concentration divided by the initial concentration. The data in Table 5 illustrates that the polymeric materials used as part of this invention sorbed relatively low amounts of surfactant as compared to certain non-preferred polymers. The values shown are averages for two or more resins within each group or class of resins.

TABLE 5

Percentage of Nonionic Surfactant Removed by Sorption to the Polymer

| Polymeric Material | 1% aqueous Triton X-100 | 1% aqueous Triton X-165 | 3% aqueous Renex KB |
|---|---|---|---|
| ABS (acrylonitrile-butadiene-styrene copolymer) |  | 4 | 0 |
| Amberlite ® XAD resins |  |  | 14 |
| Ambersorb carbonaceous resins |  |  | 15 |
| carbon-filled NBR (nitrile-butadiene rubber) | 3 | 2 | 0 |
| Kodar PETG, amorph. polyester | 6 |  |  |
| Kraton synthetic rubber (Shell) | 6 |  |  |
| Hytrel ® resin (polyether/polyester block copolymer) | 5 | 5 |  |
| Lomod ® resin (polyether/polyester block copolymer) | 5 | 5 | 0 |
| neoprene (Baypren MIA) | 8 |  |  |
| Noryl ® resin, GE Plastics | 2 |  |  |
| nylon 6,6 | 2 | 0 |  |
| PEBAX (polyether-polyamide block copolymer) |  |  | 0 |
| poly(ethylene) | 7 |  |  |
| poly(ethylene terephthalate), PET | 0 |  |  |
| poly(2,6-dimethyl-1,4-phenylene oxide), PPO ® resin | 4 |  |  |
| poly(propylene) | 6 |  |  |
| poly(urethane) foam | 22 |  |  |
| Poly-SEP resin, 1–12% divinylbenzene (DVB) | 0 |  |  |
| Poly-SEP resin, 50% divinylbenzene (DVB) | 67 |  |  |
| poly(vinyl chloride) | 5 |  |  |
| rubber tire tread | 4 | 2 |  |
| Siltem 2000, silicone/polyamide block copolymer (GE) | 8 |  |  |
| Tenax-GR, P3O | 2 |  |  |
| poly(2,6-diphenyl-1,4-phenylene oxide), P3O fiber | 2 | 1 |  |

What is claimed is:

1. A method for removing halogenated organic compounds from a contaminated medium which comprises the steps of contacting the contaminated medium with an aqueous surfactant solution to disperse the compound in the solution, contacting the solution containing dispersed compound with a sorbant polymeric material capable of selectively sorbing the halogenated organic compounds from the surfactant solution, said polymeric material comprising soft blocks and hard blocks in the polymer backbone or being soft rubber admixed with a hard filler, separating the polymeric material and sorbed organic compounds from the surfactant solution, and recycling the surfactant solution into contact with the contaminated medium to disperse more halogenated organic compounds from the contaminated medium.

2. A method according to claim 1 wherein the sorbant polymeric material is selected from the group consisting of filled natural rubbers, filled polymer rubbers formed by polymerization of dienes, elastomeric polyesters, silicone polyimides, polyamide block polyethers, polymers derived from alkyl- or aryl-phenols, and polyester block polyethers.

3. The method of claim 1 wherein the surfactant is selected from the group consisting of alkylphenoxypoly(oxyethylene) alcohols, linear alkylphenol ethyloxylates, and linear aliphatic ethyloxylates.

4. The method of claim 1 in which the surfactant is an anionic alkyl-, aryl-, arylalkyl-sulfate, or sulfonate.

5. The method of claim 1 wherein the concentration of surfactant in the aqueous surfactant solution is from about 0.1% to about 3%.

6. The method of claim 1 wherein the polymeric material comprises soft polyether blocks and hard polyamide blocks.

7. The method of claim 1 wherein the polymeric material comprises soft polyether blocks and hard polyester blocks.

8. The method of claim 1 wherein the polymeric material combines hard block and soft block portions in the polymer backbone.

9. A method according to claim 1 wherein the sorbant polymeric material is selected from the group consisting of elastomeric polyesters, silicone polyimides, polyamide block polyethers, polymers derived from alkyl-or aryl-phenols, and polyester block polyethers.

10. The method of claim 1, wherein the polymeric material is SBR, EDPM or NBR rubber admixed with a hard filler.

11. A method for removing polychlorinated biphenyl compounds from a contaminated medium which comprises the steps of contacting the contaminated medium with an aqueous surfactant solution to disperse the polychlorinated biphenyl compounds in the solution, contacting the solution containing dispersed polychlorinated biphenyl compounds with a sorbant polymeric material capable of selectively sorbing the polychlorinated biphenyl compounds from the surfactant solution, said polymeric material comprising soft blocks and hard blocks in the polymer backbone or being soft rubber admixed with a hard filler, separating the polymeric material and sorbed polychlorinated biphenyl compounds from the surfactant solution, recycling the surfactant solution to disperse more polychlorinated biphenyl compounds from the contaminated medium, desorbing the polychlorinated biphenyl compounds from the polymeric material, and using the resulting contaminant-free polymeric material to sorb more polychlorinated biphenyl compound from the aqueous surfactant solution.

* * * * *